(12) United States Patent
Shingai et al.

(10) Patent No.: US 7,580,340 B2
(45) Date of Patent: Aug. 25, 2009

(54) OPTICAL RECORDING MEDIUM AND A METHOD FOR TESTING THE SAME

(75) Inventors: Hiroshi Shingai, Tokyo (JP); Jiro Yoshinari, Tokyo (JP); Hideaki Miura, Tokyo (JP)

(73) Assignee: TDK Corporation, Tokyo (JP)

( * ) Notice: Subject to any disclaimer, the term of this patent is extended or adjusted under 35 U.S.C. 154(b) by 426 days.

(21) Appl. No.: 11/287,323

(22) Filed: Nov. 28, 2005

(65) Prior Publication Data

US 2006/0114805 A1 Jun. 1, 2006

(30) Foreign Application Priority Data

Nov. 30, 2004 (JP) ............... 2004-346845

(51) Int. Cl.
*G11B 7/24* (2006.01)
(52) U.S. Cl. .................. 369/275.4; 369/275.2
(58) Field of Classification Search .......... 369/275.1, 369/275.2, 64.1, 64.2, 64.4, 275.4; 428/64.1, 428/64.2, 64.4; 430/321, 320, 270.11; 420/270.13
See application file for complete search history.

(56) References Cited

U.S. PATENT DOCUMENTS

| 6,312,779 | B1 | 11/2001 | Hirotsune et al. |
|---|---|---|---|
| 2002/0064122 | A1 | 5/2002 | Kato et al. |
| 2002/0098445 | A1 | 7/2002 | Harigaya et al. |
| 2003/0224292 | A1 | 12/2003 | Shingai et al. |
| 2004/0106065 | A1 | 6/2004 | Miyamoto et al. |
| 2004/0213121 | A1 | 10/2004 | Yoshinari et al. |
| 2005/0079444 | A1 | 4/2005 | Kiyono et al. |
| 2006/0044991 | A1 | 3/2006 | Nishihara et al. |

FOREIGN PATENT DOCUMENTS

| EP | 1 197 955 A2 | 4/2002 |
|---|---|---|
| EP | 1 369 860 A2 | 12/2003 |

(Continued)

OTHER PUBLICATIONS

Orange Forum, Media and Drive, CD-R/RW Official Guidebook, Nov. 11, 1999, p. 74, Exceed Press, Inc., Tokyo, Japan (with English translation).

*Primary Examiner*—Peter Vincent Agustin
*Assistant Examiner*—Andrew J Sasinowski
(74) *Attorney, Agent, or Firm*—Oliff & Berridge, PLC

(57) ABSTRACT

An optical recording medium and a method for testing that optical recording medium are provided, which can prevent degradation of a reproduction signal in the case where the optical recording medium is stored at a high temperature for a long time, which enables stable recording and reproduction of data before and after the high-temperature storage, and which can achieve high-speed recording and increase of recording density. In the optical recording medium, a reproduction signal output of a recording mark after high-temperature storage that is formed in a recording layer after the optical recording medium is stored at a storage temperature t in a range from 60° C. to 90° C. for at least 50−(4/3)(t−60) hours is 0.9 times or more a reproduction signal output of a recording mark before the high-temperature storage that has the same bit length as the recording mark after the high-temperature storage and is formed before the above high-temperature storage.

14 Claims, 4 Drawing Sheets

FOREIGN PATENT DOCUMENTS

| | | |
|---|---|---|
| EP | 1 372 148 A2 | 12/2003 |
| EP | 1 548 721 A1 | 6/2005 |
| EP | 1 560 210 A1 | 8/2005 |
| JP | A-2001-162940 | 6/2001 |
| JP | A-2002-008266 | 1/2002 |
| JP | A 2003-022572 | 1/2003 |
| JP | A 2004-195742 | 7/2004 |
| WO | WO 2004/025640 A1 | 3/2004 |
| WO | WO 2004/032131 A1 | 4/2004 |

US 7,580,340 B2

OPTICAL RECORDING MEDIUM AND A METHOD FOR TESTING THE SAME

BACKGROUND OF THE INVENTION

1. Field of the Invention

The present invention relates to an optical recording medium including a phase change type recording layer and a method for testing that optical recording medium.

2. Description of the Related Art

Conventionally, an optical recording medium including a plurality of information layers on a substrate is widely known, in which at least one information layer other than the farthest information layer from a light-incident surface on which a laser beam is incident is translucent and includes a recording layer formed of a phase change material (see Japanese Patent Laid-Open Publication No. 2003-22572, for example).

In that optical recording medium, the laser beam passes through the information layers when recording or reproduction of data is performed for the farthest information layer from the light-incident surface. Thus, the information layers should be highly transparent with respect to the laser beam and it is necessary to form the recording layer and a reflective layer in the information layer to be thin.

However, a case is considered where data is recorded on the thin recording layer formed of a phase change material, the optical recording medium including that recording layer is then stored at a high temperature for a long time (for example, at 80° C. for 24 hours), and thereafter data is overwritten once in a portion where data is recorded before the storage. In this case, a jitter value of a reproduction signal is largely degraded.

That problem becomes more pronounced as a recording rate is larger or the thickness of the recording layer is thinner. Thus, that problem prevents increase of the recording rate in the optical recording medium and increase of recording density of the optical recording medium by increasing the number of the information layers.

SUMMARY OF THE INVENTION

In view of the foregoing problems, various exemplary embodiments of this invention provide an optical recording medium which can prevent degradation of a reproduction signal in the case where the optical recording medium is stored at a high temperature for a long time, enables stable recording and reproduction of data before and after the high-temperature storage, and can achieve high-speed recording and increase of recording density. Various exemplary embodiments of this invention also provide a method for testing that optical recording medium.

The inventor of the present invention found as a result of earnest studies an optical recording medium which could prevent degradation of a reproduction signal in the case where the optical recording medium was stored at a high temperature for a long time and which enabled stable recording and reproduction of data before and after the high-temperature storage, and a method for testing that optical recording medium.

More specifically, the inventor of the present invention found that the aforementioned problem of the conventional technique was caused by a formation process of a recording mark (amorphous mark) during recording after high-temperature storage. Conventionally, it was considered that degradation of a jitter value after high-temperature storage occurred because a recording mark formed before the high-temperature storage was changed into a more stable state due to the high-temperature storage and therefore that recording mark was hard to erase (crystallize) after the high-temperature storage. However, the inventor of the present invention found as a result of a detailed analysis that the size of a recording mark formed by recording after high-temperature storage was smaller than that of a recording mark formed before the high-temperature storage and this size change of the recording mark between before and after the high-temperature storage caused degradation of the jitter value of the reproduction signal.

Moreover, the inventor of the present invention found that the above change of the size of the recording mark more significantly occurred in recording for a crystalline portion than in recording for an amorphous portion. Thus, when overwriting of data was performed after high-temperature storage, the size of the overwritten recording mark in the crystalline portion was different from that in the amorphous portion, causing degradation of the jitter value.

In summary, the above-described objectives are achieved by the following embodiments of the present invention.

(1) An optical recording medium comprising a plurality of information layers on a substrate, at least one of the information layers other than a farthest one of the information layer from a light-incident surface on which a laser beam is incident being translucent and including a recording layer formed of a phase change material, wherein a reproduction signal output of a recording mark after high-temperature storage that is formed in the recording layer after the high-temperature storage in which a storage temperature t is in a range from 60° C. to 90° C. and a storage time is at least $50-(4/3)(t-60)$ hours is 0.9 times or more a reproduction signal output of a recording mark before the high-temperature storage that has the same bit length as the recording mark after the high-temperature storage and is formed in the recording layer before the high-temperature storage.

(2) An optical recording medium comprising a plurality of information layers on a substrate, at least one of the information layers other than a farthest one of the information layers from a light-incident surface on which a laser beam is incident being translucent and including a recording layer formed of a phase change material, wherein an area of a recording mark after high-temperature storage that is formed in the recording layer after the high-temperature storage in which a storage temperature t is in a range from 60° C. to 90° C. and a storage time is at least $50-(4/3)(t-60)$ hours is 0.85 times or more an area of a recording mark before the high-temperature storage that has the same bit length as the recording mark after the high-temperature storage and is formed in the recording layer before the high-temperature storage.

(3) The optical recording medium according to (1) or (2), wherein the recording layer contains at least Sb and Ge.

(4) The optical recording medium according to (3), wherein the recording layer is formed from an element selected from elements of groups 1 to 15, 17, and 18.

(5) The optical recording medium according to any one of (1) to (4), wherein a transmittance of the translucent information layer with respect to the laser beam at a particular recording wavelength is in a range from 30% to 80%.

(6) A method for testing an optical recording medium including a plurality of information layers on a substrate, at least one of the information layers other than a farthest one of the information layers from a light-incident surface on which a laser beam is incident being translucent and including a recording layer formed of a phase change material, the method comprising the steps of: recording a first recording mark on the recording layer; measuring a reproduction signal output of the first recording mark; storing the optical recording medium at a storage temperature t in a range from about 60° C. to about 90° C. for at least 50−(4/3)(t−60) hours; recording a second recording mark having the same bit length as the first recording mark on the recording layer after the high-storage temperature; measuring a reproduction signal output of the second recording mark; and determining whether or not the reproduction signal output of the second recording mark is 0.9 times or more the reproduction signal output of the first recording mark.

(7) A method for testing an optical recording medium including a plurality of information layers on a substrate, at least one of the information layers other than a farthest one of the information layers from a light-incident surface on which a laser beam is incident being translucent and including a recording layer formed of a phase change material, the method comprising the steps of: recording a first recording mark on the recording layer; measuring an area of the first recording mark; storing the optical recording medium at a storage temperature t in a range from about 60° C. to about 90° C. for at least 50−(4/3)(t−60) hours; recording a second recording mark having the same bit length as the first recording mark on the recording layer after the high-temperature storage; measuring an area of the second recording mark; and determining whether or not the area of the second recording mark is 0.85 times or more the area of the first recording mark.

An optical recording medium and a method for testing that optical recording medium according to the present invention have excellent advantageous effects that degradation of a reproduction signal in the case where the optical recording medium is stored at a high temperature for a long time can be prevented, stable recording and reproduction of data can be performed before and after the high-temperature storage, and high-speed recording and increase of recording density can be achieved.

DETAILED DESCRIPTION OF THE PREFERRED EMBODIMENTS

Figure 1:
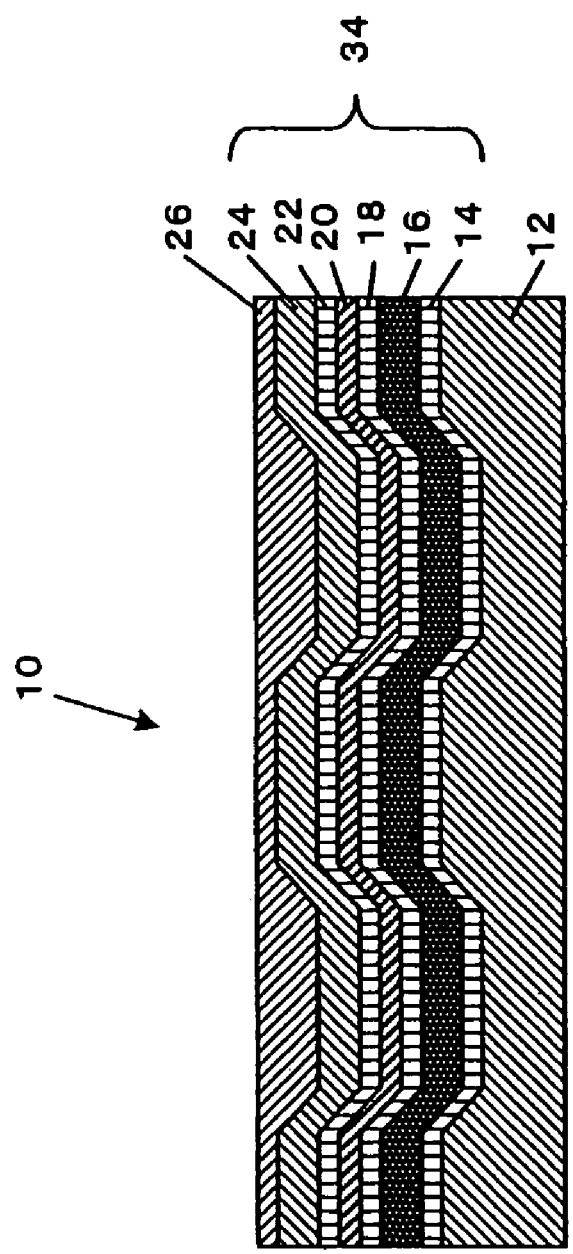
FIG. 1 is a schematic cross-sectional view of an optical recording medium according to Example 1 of the present invention.

The present invention provides an optical recording medium including a plurality of information layers on a substrate, at least one of the information layers other than a farthest one of the information layers from a light-incident surface on which a laser beam is incident being translucent and including a recording layer formed of a phase change material. In the optical recording medium, a reproduction signal output of a recording mark after high-temperature storage that is formed in the recording layer after the high-temperature storage in which a storage temperature t is in a range from 60° C. to 90° C. and a storage time is at least 50−(4/3)(t−60) hours is 0.9 times or more a reproduction signal output of a recording mark before the high-temperature storage that has the same bit length as the recording mark after the high-temperature storage and is formed in the recording layer before the high-temperature storage. Due to this, degradation of a reproduction signal in a case where the optical recording medium is stored at a high temperature for a long time can be prevented and stable recording and reproduction of data can be performed before and after the high-temperature storage.

Moreover, the present invention provides an optical recording medium including a plurality of information layers on a substrate, at least one of the information layers other than a farthest one of the information layers from a light-incident surface on which a laser beam is incident being translucent and including a recording layer formed of a phase change material. In the optical recording medium, an area of a recording mark after high-temperature storage that is formed in the recording layer after the high-temperature storage in which a storage temperature t is in a range from 60° C. to 90° C. and a storage time is at least 50−(4/3)(t−60) hours is 0.85 times or more an area of a recording mark before the high-temperature storage that has the same bit length as that of the recording mark after the high-temperature storage and is formed in the recording layer before the high-temperature storage. Due to this, the aforementioned problem of the conventional technique can be overcome.

An exemplary configuration of the information layer in the optical recording medium according to the present invention includes a first dielectric layer, a reflective layer, a second dielectric layer, a recording layer, a third dielectric layer, and a heat-sink layer, which are formed on a substrate in that order.

The first dielectric layer is provided for protecting the reflective layer and adjusting a transmittance. A material for the first dielectric layer is not specifically limited. Example of the material for the first dielectric layer includes an oxide, a nitride, a sulfide, a carbide, a fluoride, each of which contains at least one metal selected from the group consisting of Ti, Zr, Hf, Ta, Si, Al, Mg, Y, Ce, Zn, In, Cr, and Nb, or a compound thereof. In an exemplary embodiment of the present invention, the first dielectric layer is formed of a material containing zirconium oxide as a major component. The major component in the present invention means a component having a molar ratio to total of 60% or more. It is preferable that a thickness D1 of the first dielectric layer satisfy 1 nm$\leq$D1$\leq$60 nm. When the thickness D1 of the first dielectric layer is thinner than 1 nm, sufficient protection of the reflective layer is not obtained. When the thickness D1 of the first dielectric layer is thicker than 60 nm, the transmittance gets out of a desirable range.

The reflective layer is provided for dissipating heat and achieving an optical interference effect and is preferably formed of an Ag alloy. A thickness Tr of the reflective layer is set to satisfy 0<Tr<30 nm in order to achieve a translucent structure. More preferably, the thickness Tr satisfies 0<Tr<20 nm. A thickness Trec of the recording layer preferably satisfies 2 nm$\leq$Trec$\leq$12 nm, more preferably, 3 nm$\leq$Trec$\leq$8 nm.

Due to the above configuration, the transmittance of the entire information layer at a particular recording wavelength is set to 30% or more and 80% or less. This is because it is difficult to record data on the farthest information layer from the light-incident surface on which the laser beam is incident when the transmittance of the information layer is less than 30%, and recording of data on the information layers is difficult when the transmittance of the information layer exceeds 80%.

The recording layer is formed of at least Sb and Ge. The recording layer may contain Mg. The recording layer may further contain at least one additive selected from the group consisting of N, Al, Si, Mn, Zn, Ga, Sn, Bi, and the like.

A preferable range of an atomic weight percentage of Sb is $60 \leq Sb \leq 95$. When the atomic weight percentage of Sb is less than 60 at %, a speed of crystallization is lowered and it is therefore difficult to erase a mark. When the atomic weight percentage of Sb is more than 95 at %, the speed of crystallization is too fast and it is therefore difficult to perform low-speed recording. Thermal stability of the mark is also impaired. A preferable range of an atomic weight percentage of Ge is $0 < Ge \leq 20$. When the atomic weight percentage of Ge is 0 at %, the thermal stability of the mark is impaired. When the atomic weight percentage of Ge is more than 20 at %, the speed of crystallization is lowered and it is difficult to erase the mark. A preferable range of an atomic weight percentage of Mg is $0 \leq Mg \leq 20$. When the atomic weight percentage of Mg is more than 20 at %, the speed of crystallization is lowered and it is difficult to erase the mark.

The second dielectric layer protects the recording layer and the reflective layer and controls dissipation of heat from the recording layer to the reflective layer. A material for the second dielectric layer is not specifically limited. Examples of the material for the second dielectric layer include an oxide, a nitride, a sulfide, a carbide, a fluoride, each of which contains at least one metal selected from the group consisting of Ti, Zr, Hf, Ta, Si, Al, Mg, Y, Ce, Zn, In, Cr, and Nb, or a compound thereof. In the exemplary embodiment of the present invention, the second dielectric layer is formed of a material containing zirconium oxide as a major component. The major component in the present invention means a component having a molar ratio to total of 60% or more. A thickness D2 of the second dielectric layer preferably satisfies $2\ nm \leq D2 \leq 20\ nm$. When the thickness D2 is thinner than 2 nm, sufficient protection of the recording layer and the reflective layer by the second dielectric layer cannot be achieved. When the thickness D2 is thicker than 20 nm, heat from the recording layer cannot rapidly be transferred to the reflective layer. This causes lowering of a cooling rate and makes it difficult to precisely form an amorphous mark.

The third dielectric layer protects the recording layer, adjusts optical characteristics, and controls dissipation of heat from the recording layer to the heat-sink layer. A material for the third dielectric layer is not specifically limited. Examples of the material for the third dielectric layer include an oxide, a nitride, a sulfide, a carbide, a fluoride, each of which contains at least one metal selected from the group consisting of Ti, Zr, Hf, Ta, Si, Al, Mg, Y, Ce, Zn, In, Cr, and Nb, or a compound thereof. The third dielectric layer is preferably formed of a mixture of ZnS and $SiO_2$. It is preferable that a molar ratio of ZnS to $SiO_2$ be in a range from 50:50 to 95:5. When the molar ratio gets out of that range, a refractive index and an index of absorption of the mixture of ZnS and $SiO_2$ change and therefore adjustment of the optical characteristics becomes difficult. A thickness D3 of the third dielectric layer preferably satisfies $5\ nm \leq D3 \leq 50\ nm$. When the thickness D3 is thinner than 5 nm, the protection of the recording layer and the adjustment of the optical characteristics are difficult. When the thickness D3 is thicker than 50 nm, the property of transferring heat from the recording layer to the heat-sink layer is lowered. In the exemplary embodiment of the present invention, the third dielectric layer is formed of a material that contains zirconium oxide as a major component arranged on a recording-layer side and a mixture of ZnS and $SiO_2$ arranged on a light-receiving-surface side.

The heat-sink layer is provided for controlling dissipation of heat from the recording layer so as to enhance an effect of cooling the recording layer, thereby making precise formation of an amorphous mark easier. A material for the heat-sink layer is not specifically limited, but preferably has a higher thermal conductivity than the material for the third dielectric layer. It is preferable to use AlN, SiN, BN, $Al_2O_3$, or $TiO_2$ as the material for the radiation layer, for example. In the exemplary embodiment of the present invention, the heat-sink layer is formed of AlN. A thickness Theat of the heat-sink layer may be $15\ nm \leq Theat < 150\ nm$, or $20\ nm \leq Theat < 120\ nm$. When the thickness of the heat-sink layer is thinner than 15 nm, an effect of dissipating heat from the recording layer is small. When the thickness of the heat-sink layer is 150 nm or more, a time required for depositing the heat-sink layer becomes long, resulting in lowering of productivity.

Each of the first, second, and third dielectric layers may be formed by a single dielectric layer or a plurality of dielectric layers.

An example of the present invention is now described in detail with reference to the drawings.

EXAMPLE 1

Figure 2:
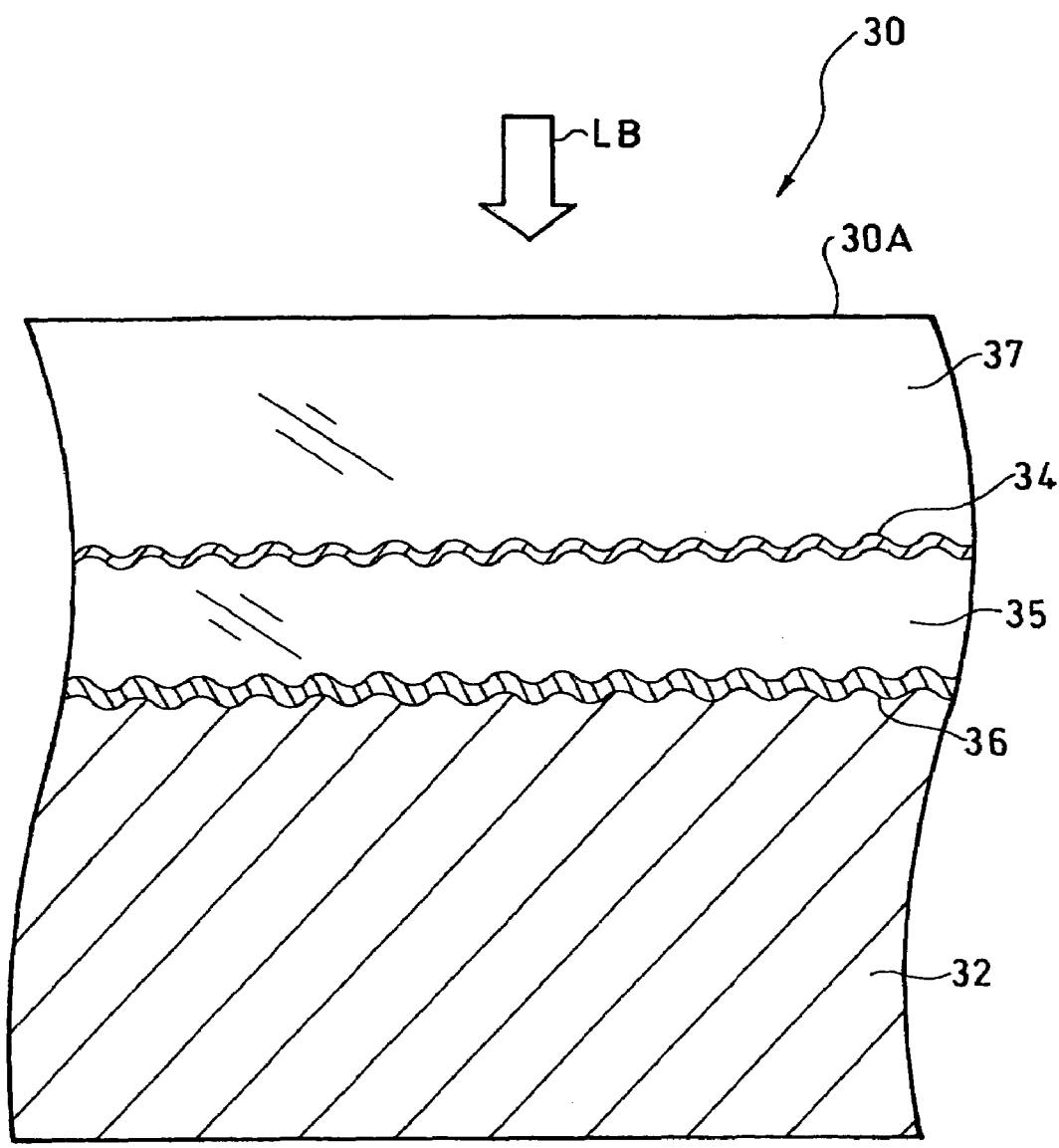
FIG. 2 is a schematic cross-sectional view showing an exemplary optical recording medium according to the present invention.

As shown in FIG. 1, an optical recording medium 10 of Example 1 is formed by forming an information layer 34 that includes a first dielectric layer 14, a reflective layer 16, a second dielectric layer 18, a recording layer 20, a third dielectric layer 22, and a heat-sink layer 24 on a substrate 12 made of polycarbonate having a thickness of 1.1 mm by sputtering, then crystallizing the entire surface of the information layer 34 by an initialization machine, and finally forming a light transparent layer 26 having a thickness of 0.1 mm on the information layer 34. In Example 1, the optical recording medium 10 is formed to include a single information layer 34 for convenience of experiments. However, the present invention can be also applied to an optical recording medium 30 shown in FIG. 2, including a plurality of information layers 34 and 36 on a substrate 32, in which at least one information layer 34 other than a farthest information layer 36 from a light-incident surface 30A on which a laser beam LB is translucent and includes a recording layer formed of a phase change material.

The substrate 32 of the optical recording medium 30 has a thickness of about 1.1 mm. This and the following description can be also applied to the substrate 12 of the optical recording medium 10. The laser beam LB is irradiate on the information layers through the light transparent layer 37 arranged on an opposite side to the substrate 32 (i.e., from the light-incident-surface 30A side). Thus, it is not always necessary that the substrate 32 can transmit light.

Moreover, the substrate 32 is provided with grooves formed on its surface. Those grooves serve as guide tracks for the laser beam LB when data is recorded on the information layer 36 and when data is reproduced from the information layer 36. Those grooves are formed by injection molding using a stamper, for example.

A spacer layer 35 has a function of separating the information layers 34 and 36 from each other with a physically and optically sufficient distance between them. The spacer layer 35 should have sufficiently high light-transmitting property, because the laser beam LB passes through the spacer layer 35 when data is recorded on the information layer 36 and when data is reproduced from the information layer 36. Thus, a material for the spacer layer 35 has to be optically transparent, have low optical absorption and reflection, and have a small index of birefringence. The material for the spacer layer 35 is not specifically limited, as long as it satisfies the above requirements. However, it is preferable that the spacer layer 35 be formed of a UV-curable resin such as a UV-curable acrylic resin.

Grooves are formed on a surface of the spacer layer 35. Those grooves serve as guide tracks for the laser beam LB when data is recorded on the information layer 34 and when data is reproduced from the information layer 34.

Moreover, it is preferable that the spacer layer 35 be formed by applying solution of a UV-curable resin onto the information layer 36 by spin coating so as to form a film and then irradiating the film with ultraviolet rays through a stamper placed on the film. In this case, the stamper has a similar concavo-convex pattern to that of the stamper used for forming the substrate 32.

The light transparent layer 37 is a layer that can transmit the laser beam LB. This and the following description of the light transparent layer 37 can be also applied to the light transparent layer 26 of the optical recording medium 10. One surface of the light transparent layer 37 serves as the light-incident surface. A material for the light transparent layer 37 has to be optically transparent, have low optical absorption and reflection, and have a small index of double refraction. The material for the light transparent layer 37 is not specifically limited, as long as it satisfies the above requirements. A resin composition containing a UV-curable resin, an electron beam curable resin, or the like is preferably used as the material for the light transparent layer 37. More preferably, a resin composition containing a UV-curable acrylic resin is used. It is preferable that the light transparent layer 37 have a thickness of 30 μm to 200 μm.

It is preferable that the light transparent layer 37 be formed by applying solution of a resin composition onto the surface of the information layer 34 by spin coating. Alternatively, the light transparent layer 37 may be formed by bonding a sheet of a light transmitting resin to the surface of the information layer 34 with an adhesive.

The recording layer of the information layer 36 may be formed of any of a phase change material, a dye material, and an inorganic write-once material. Moreover, the recording layer of the information layer 36 may be ROM (Read Only Memory) type. That is, a material for the recording layer of the information layer 36 is not specifically limited.

For example, the optical recording medium 30 has the following structure. The information layer 36, the spacer layer 35 having a thickness of 25 μm, the information layer 34, and the light transparent layer 37 having a thickness of 75 μm are sequentially formed on the substrate 32 having a thickness of 1.1 mm. The information layer 36 is formed by depositing, in this order, a layer of AgNdCu (Ag: Nd: Cu=98 at %: 1 at %: 1 at %) having a thickness of 100 nm, serving as the reflective layer; a layer of $CeO_2$ having a thickness of 10 nm and a layer of ZnS: $SiO_2$ (ZnS: $SiO_2$=50 mol %: 50 mol %) having a thickness of 10 nm, serving as the first dielectric layer; a layer of SbTeGe (Sb: Te: Ge=75 at %: 19 at %: 6 at %) having a thickness of 12 nm, serving as the recording layer; a layer of ZnS: $SiO_2$ (ZnS: $SiO_2$=80 mol %: 20 mol %) having a thickness of 40 nm, serving as the second dielectric layer; and a layer of AlN having a thickness of 30 nm, serving as the heat-sink layer.

Returning to FIG. 1, in the optical recording medium 10 of Example 1, a layer of $ZrO_2$ having a thickness of 5 nm was formed to serve as the first dielectric layer 14; a layer of AgPdCu (Ag: Pd: Cu=98 at %: 1 at %: 1 at %) having a thickness of 10 nm was formed to serve as the reflective layer 16; a layer of $ZrO_2$ having a thickness of 4 nm was formed to serve as the second dielectric layer 18; a layer of $ZrO_2$ having a thickness of 5 nm and a layer of ZnS—$SiO_2$ (ZnS: $SiO_2$=80 mol %: 20 mol %) having a thickness of 10 nm were formed to serve as the third dielectric layer 22; and a layer of AlN having a thickness of 40 nm was formed to serve as the heat-sink layer 24. The light transparent layer 26 was formed of a UV-curable acrylic resin by spin coating.

The recording layer 20 was formed to have a thickness of 6 nm. As a material for the recording layer 20, two phase change materials, i.e., SbGeMg (Sb: Ge: Mg=83 at %: 15 at %: 2 at %) and SbTeGe (Sb: Te: Ge=76 at %: 19 at %: 5 at %) were prepared.

The optical recording medium including the recording layer 20 formed of SbGeMg was used as Sample No. 1 of the optical recording medium of the present invention, and the optical recording medium including the recording layer 20 formed of SbTeGe was used as Sample No. 2. Samples Nos. 1 and 2 were set in an optical recording medium estimation apparatus one by one, and a mixture of a recording mark having a bit length of 2T and a recording mark having a bit length of 7T (where T is one clock period) were recorded on the recording layer 20 under a recording condition in which a laser wavelength was 405 nm, NA was 0.85, a recording signal was (1, 7) RLL modulation signal, a bit length was 0.12 μm/bit, and a recording linear velocity was 10.5 m/s. The recorded marks were observed with TEM. The observation results are shown in Table 1.

TABLE 1

| | Sample No. 1: Sb83Ge15Mg2(at %) | | | | Sample No. 2: Sb76Te19Ge5(at %) | | | |
|---|---|---|---|---|---|---|---|---|
| | 2T-mark | | 7T-mark | | 2Tmark | | 7T-mark | |
| | Width(nm) | Length(nm) | Width(nm) | Length(nm) | Width(nm) | Length(nm) | Width(nm) | Length(nm) |
| Archival signal | 240 | 170 | 250 | 590 | 200 | 140 | 150 | 500 |
| One time recording signal | 225 | 160 | 247 | 540 | 155 | 110 | 110 | 500 |
| Change rate of a length | 0.938 | 0.941 | 0.988 | 0.915 | 0.775 | 0.786 | 0.733 | 1.000 |
| Change rate of an area | 0.88 | | 0.90 | | 0.61 | | 0.73 | |

In Table 1, the term "Archival signal" represents the width and the length of each of the 2T recording mark and the 7T recording mark that were measured after the mixture of the recording marks were recorded on the recording layer 20 and thereafter the optical recording medium 10 was stored at a temperature of about 80° C. for about 24 hours. The term "One time recording signal" in Table 1 represents the width and the length of each of the 2T recording mark and the 7T recording mark measured after the optical recording medium 10 in which no recording mark was recorded on the recording layer 20 was stored at a temperature of about 80° C. for about 24 hours and thereafter the mixture of recording marks was recorded once in a crystalline portion (i.e., a portion where no recording mark was formed) of the recording layer 20. A recording power, an erasing power, and a bias power of the laser beam before the high-temperature storage were set to be the same as those after the high-temperature storage, and were set to 9.5 mW, 3.4 mW, and 0.3 mW, respectively.

Table 1 shows that, for both Samples Nos. 1 and 2, the width and the length of the recording marks of "One time recording signal" are the same or smaller than those of the recording marks of "Archival signal" in spite of the same recording power before and after the high-temperature storage.

More specifically, for Sample No. 1, a width change rate of the 2T recording mark (the width of the recording mark of the one time recording signal/the width of the recording mark of Archival signal) was 0.938; a length change rate of the 2T recording mark (the length of the recording mark of the one time recording signal/the length of the recording mark of Archival signal was 0.941; an area change rate of the 2T recording mark (the area of the recording mark of the one time recording signal/the area of the recording mark of Archival signal) was 0.88; a width change rate of the 7T recording mark was 0.988; a length change rate of the 7T recording mark was 0.915; and an area change rate of the 7T recording mark was 0.90. The area of each recording mark was calculated as a product of "the width of that recording mark" and "the length of that recording mark" in Example 1, and the area change rate was calculated based on the thus calculated area. However, a method for calculating the area of each recording mark is not limited thereto.

As described above, for Sample No. 1, it is found that the area of the 2T (or 7T) recording mark after the high-temperature storage is 0.85 times or more the area of the 2T (or 7T) recording mark before the high-temperature storage.

On the other hand, for Sample No. 2, the width change rate of the 2T recording mark was 0.775; the length change rate of the 2T recording mark was 0.786; the area change rate of the 2T recording mark was 0.61; the width change rate of the 7T recording mark was 0.733; the length change rate of the 7T recording mark was 1.000; and the area change rate of the 7T recording mark was 0.73. It is found from those results that the area of the 2T (or 7T) recording mark after the high-temperature storage is less than 0.85 times the area of the 2T (or 7T) recording mark before the high-temperature storage.

TABLE 2

| PP change rate | Jitter value |
|---|---|
| 0.799 | 17 |
| 0.849 | 13.2 |
| 0.893 | 10.9 |
| 0.925 | 9.7 |
| 0.931 | 8.8 |
| 0.943 | 8.4 |
| 1.000 | 6.1 |

Table 2 shows results of measurement of a change rate of a reflectivity difference (PP) between a crystalline portion and a non-crystalline portion and a jitter value in the case where a mixture of recording marks having bit lengths of 2T to 8T was recorded on the recording layer 20 under the above recording condition, the optical recording medium 10 was then stored at a temperature of 80° C. for 24 hours, and thereafter the mixture of recording marks was overwritten once in the amorphous portion (i.e., the portion where the recording marks were already recorded).

Figure 3:
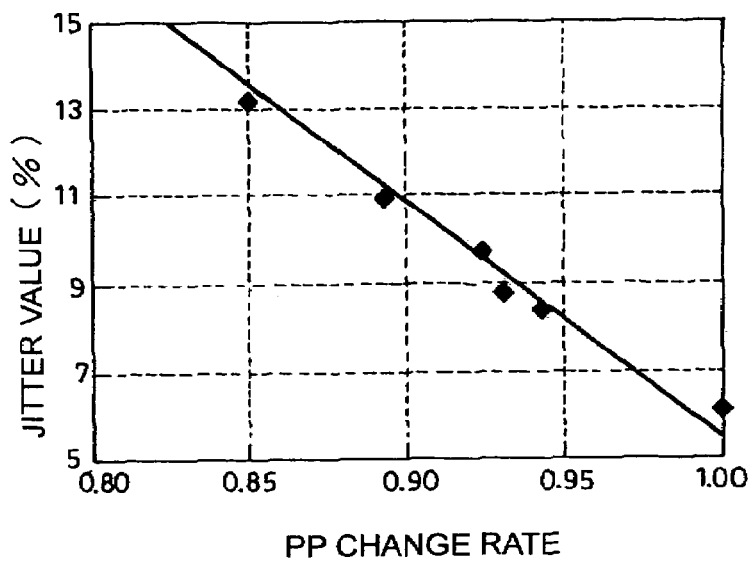
FIG. 3 is a graph showing the relationship between a PP change rate and a jitter value in the optical recording medium of Example 1.

FIG. 3 shows a graph showing a relationship between the PP change rate and the jitter value based on the above measurement results. The term "PP change rate" represented by a horizontal axis in this graph is a value obtained by dividing a reflectivity difference between the crystalline portion and the amorphous portion when the recording marks were recorded while the recording power of the laser beam were changed from 8.0 mW to 10.5 mW by a reflectivity difference between the crystalline portion and the amorphous portion when the recording mark recorded with the recording power of 9.5 mW before the high-temperature storage was reproduced after the high-temperature storage. The PP change rate can be regarded as equivalent for a value obtained by dividing a reproduction signal output of the recording mark after the high-temperature storage by a reproduction signal output of the recording mark before the high-temperature storage.

As shown in Table 2 and FIG. 3, in the case where the PP change rate is 1.00, i.e., the area (size) of the recording mark does not change between before and after the high-temperature storage, the jitter value is about 6.1% and good characteristics are obtained.

As the PP change rate is reduced from 1.00, i.e., the area of the recording mark after the high-temperature storage becomes smaller than the area of the recording mark before the high-temperature storage, the jitter value is gradually degraded. However, when the PP change rate is 0.90 or more (the area change rate of the recording mark is 0.85 times or more), the jitter value can be suppressed to be about 11% or less. That is, basically good characteristics can be obtained.

According to the optical recording medium of Sample No. 1, the area of the recording mark after the high-temperature storage that is formed in the recording layer 20 after the optical recording medium is stored at about 80° C. for about 24 hours, is 0.85 times or more the area of the recording mark before the high-temperature storage that has the same bit length as the recording mark after the high-temperature storage and is recorded on the recording layer 20 before the high-temperature storage. Thus, it is possible to prevent degradation of a reproduction signal in the case where the optical recording medium is stored at a high temperature for a long time so as to enable stable recording and reproduction of data before and after the high-temperature storage. It is also possible to achieve high-speed recording and increase of recording density.

Moreover, in the optical recording medium of Sample No. 1, a reproduction signal output of the recording mark after the high-temperature storage is 0.9 times or more a reproduction signal output of the recording mark before the high-temperature storage (i.e., the PP change rate is 0.90 or more). Thus, the similar effects can be obtained.

In addition, since the recording layer 20 of the optical recording medium of Sample No. 1 contains at least Sb and Ge, degradation of the reproduction signal can be more effectively prevented.

Since the recording layer 20 of the optical recording medium of Sample No. 1 is formed of an element selected from elements of groups 1 to 15, 17, and 18 (i.e., the recording layer 20 is formed of a non-chalcogenide material), the optical recording medium of Sample No. 1 has a higher effect of preventing degradation of the reproduction signal, as compared with the optical recording medium of Sample No. 2 in which the recording layer 20 contains a group 16 (chalcogen group) element (i.e., Te in Example 1).

Moreover, since the transmittance of the translucent information layer 34 with respect to a laser beam at a particular recording wavelength is in a range from 30% to 80%, the laser beam can be efficiently transmitted even in the case where a plurality of information layers are provided. Thus, stable recording and reproduction of data can be performed.

An optical recording medium of the present invention is not limited to the optical recording medium 10 of Example 1. Although an example in which the optical recording medium 10 is stored at a temperature of about 80° C. for about 24 hours is described in Example 1, the storage condition of the optical recording medium 10 (i.e., the storage temperature and the storage time) is not limited thereto.

Figure 4:
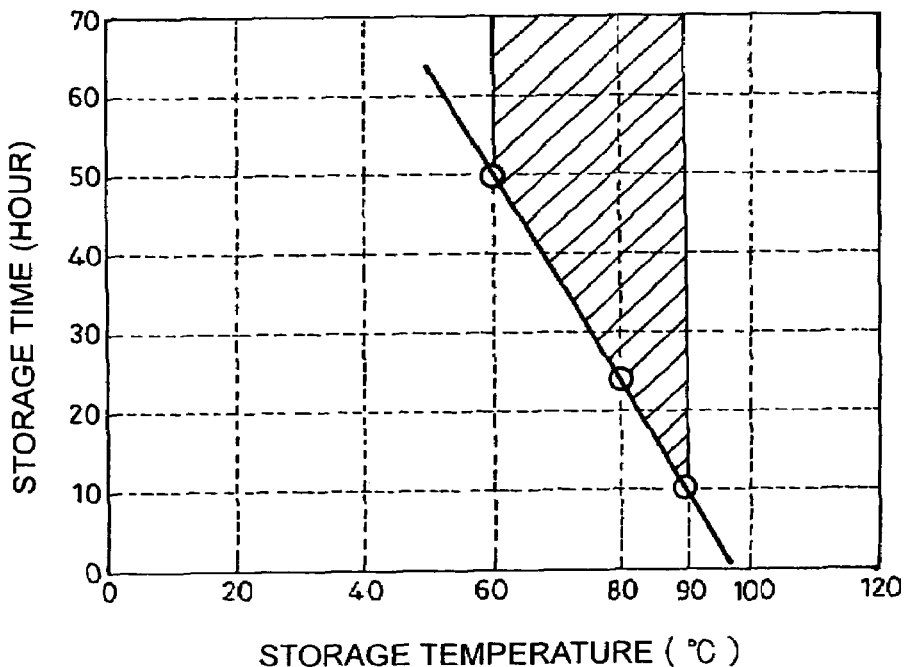
FIG. 4 is a graph showing the relationship between a storage temperature and a storage time that provide a degradation amount of the jitter value of about 2% in the case where a recording mark is overwritten after high-temperature storage.

Experiments made by the inventor of the present invention revealed that the amount of degradation of the jitter value of the optical recording medium 10 between before and after the high-temperature storage exceeded about 2% in the case where the optical recording medium 10 was stored at a storage temperature t in a range from 60° C. to 90° C. for at least 50−(4/3)(t−60) hours and thereafter the recording mark was overwritten on the recording layer 20, as shown in FIG. 4 as a shaded area. Thus, it is preferable to apply the present invention under the above storage condition. In this case, the amount of degradation of the jitter value between before and after the high-temperature storage can be suppressed to be less than about 2%. However, it is possible to reduce the amount of degradation of the jitter value between before and after the high-temperature storage even under other storage conditions (e.g., in the case where the storage temperature is lower than 60° C. or higher than 90° C. or the case where the storage time is shorter than 50−(4/3)(t−60) hours).

The configuration of the optical recording medium according to the present invention is not limited to the configuration shown in Example 1. Therefore, a configuration can be employed in which a laser beam is irradiate on the information layer through a substrate, for example. In this case, a dielectric layer, a recording layer, a dielectric layer, and a reflective layer are formed on the substrate in that order from the substrate. Finally, a protection layer is formed. Moreover, the dielectric layer may be formed by a single layer or a plurality of layers in any structure. Furthermore, the dielectric layer may be provided at both interfaces of the reflective layer.

Figure 5:
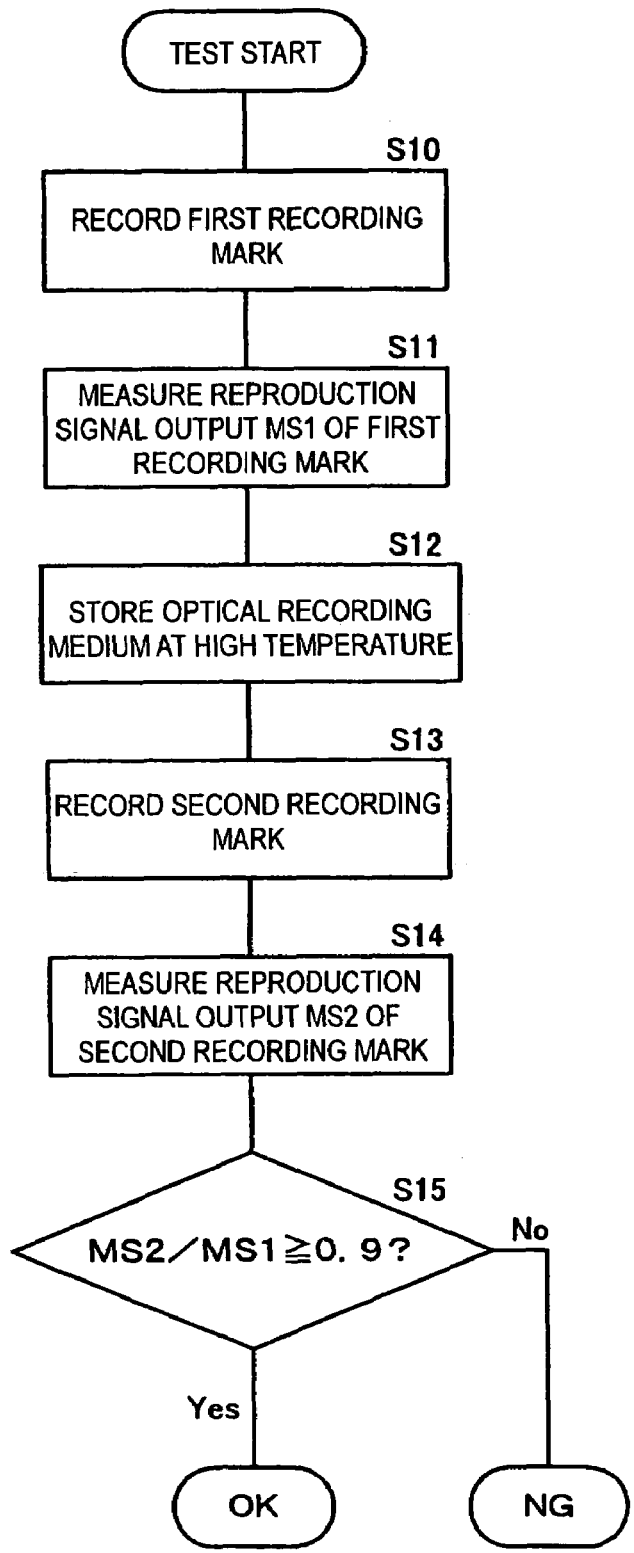
FIG. 5 is a flowchart of an exemplary method for testing an optical recording medium according to the present invention.

An optical recording medium that can prevent degradation of a reproduction signal in the case where the optical recording medium is stored at a high temperature for a long time and can allow stable recording and reproduction of data to be performed before and after high-temperature storage (e.g., the optical recording medium of Sample No. 1 in Example 1) can be easily picked by employing the following method for testing an optical recording medium, as shown in FIG. 5. The method includes the steps of: recording a first recording mark on a recording layer 20 (Step S10); measuring a reproduction signal output MS1 of the first recording mark (Step S11); storing the optical recording medium at a storage temperature t in a range from about 60° C. to about 90° C. for at least 50−(4/3)(t−60) hours (Step S12); recording a second recording mark having the same bit length as the first recording mark on the recording layer 20 after the high-temperature storage (Step S13); measuring a reproduction signal output MS2 of the second recording mark (Step S14); and determining whether or not the reproduction signal output MS2 of the second recording mark is 0.9 times or more the reproduction signal output MS1 of the first recording mark (Step S15).

The testing method of the present invention is not limited to that shown in FIG. 5. For example, the same effects as those obtained by the testing method shown in FIG. 5 can be obtained by another method for testing an optical recording medium. The other method includes the steps of: recording a first recording mark on a recording layer 20; measuring an area MA1 of the first recording mark; storing the optical recording medium 10 at a storage temperature t in a range from about 60° C. to about 90° C. for at least 50−(4/3)(t−60) hours; recording a second recording mark having the same bit length as the first recording mark on the recording layer 20 after the high-temperature storage; measuring an area MA2 of the second recording mark; and determining whether or not the area MA2 of the second recording mark is 0.85 times or more the area MA1 of the first recording mark.

The present invention can be applied to an optical recording medium including a phase change type recording layer as typified by DVD-RW, Blu-ray Disc, or the like.

What is claimed is:

1. An optical recording medium comprising a plurality of information layers on a substrate, at least one of the information layers other than a farthest one of the information layer from a light-incident surface on which a laser beam is incident being translucent and including a recording layer formed of a phase change material, wherein at least one of width and length of a recording mark after high-temperature storage is 0.9 times or more at least one of width and length of a recording mark before high-temperature storage, the recording mark before high-temperatures storage is formed in the recording layer before a high-temperature storage, in the high-temperature storage, a storage temperature t is in a range from 60° C. to 90° C. and a storage time is at least 50−(4/3)(t−60) hours, the recording mark after high-temperature storage is formed in the recording layer after the high-temperature storage and has the same bit length as the recording mark before high-temperature storage.

2. The optical recording medium according to claim 1, wherein the recording layer contains at least Sb and Ge.

3. The optical recording medium according to claim 2, wherein a transmittance of the translucent information layer with respect to the laser beam is in a range from 30% to 80%.

4. The optical recording medium according to claim 1, wherein a transmittance of the translucent information layer with respect to the laser beam at a particular recording wavelength is in a range from 30% to 80%.

5. An optical recording medium comprising a plurality of information layers on a substrate, at least one of the information layers other than a farthest one of the information layers from a light-incident surface on which a laser beam is incident being translucent and including a recording layer formed of a phase change material, wherein an area of a recording mark after high-temperature storage is 0.85 times or more an area of a recording mark before high-temperature storage, the recording mark before high-temperature storage is formed in the recording layer before a high-temperature storage, in the high-temperature storage, a storage temperature t is in a range from 60° C. to 90° C. and a storage time is at least 50−(4/3)(t−60) hours, the recording mark after high-temperature storage is formed in the recording layer after the high-temperature storage and has the same bit length as the recording mark before high-temperature storage.

6. The optical recording medium according to claim 5, wherein the recording layer contains at least Sb and Ge.

7. The optical recording medium according to claim 6, wherein the recording layer is formed from elements selected from elements of periodic table groups 1 to 15, 17 and 18, the recording layer being a non-chalcogenide material.

8. The optical recording medium according to claim 6, wherein a transmittance of the translucent information layer with respect to the laser beam is in a range from 30% to 80%.

9. The optical recording medium according to claim 7, wherein a transmittance of the translucent information layer with respect to the laser beam is in a range from 30% to 80%.

10. The optical recording medium according to claim 2, wherein the recording layer is formed from elements selected from elements of periodic table groups 1 to 15, 17 and 18, the recording layer being a non-chalcogenide material.

11. The optical recording medium according to claim 10, wherein a transmittance of the translucent information layer with respect to the laser beam is in a range from 30% to 80%.

12. The optical recording medium according to claim 5, wherein a transmittance of the translucent information layer with respect to the laser beam is in a range from 30% to 80%.

13. A method for testing an optical recording medium including a plurality of information layers on a substrate, at least one of the information layers other than a farthest one of the information layers from a light-incident surface on which a laser beam is incident being translucent and including a recording layer formed of a phase change material, the method comprising the steps of:

recording a first recording mark on the recording layer;

measuring at least one of width and length of the first recording mark;

storing the optical recording medium at a storage temperature t in a range from about 60° C. to about 90° C. for at least $50-(4/3)(t-60)$ hours;

recording a second recording mark having the same bit length as the first recording mark on the recording layer after the high-storage temperature;

measuring at least one of width and length of the second recording mark; and determining whether or not at least one of width and length of the second recording mark is 0.9 times or more at least one of width and length of the first recording mark.

14. A method for testing an optical recording medium including a plurality of information layers on a substrate, at least one of the information layers other than a farthest one of the information layers from a light-incident surface on which a laser beam is incident being translucent and including a recording layer formed of a phase change material, the method comprising the steps of:

recording a first recording mark on the recording layer;

measuring an area of the first recording mark;

storing the optical recording medium at a storage temperature t in a range from about 60° C. to about 90° C for at least $50-(4/3)(t-60)$ hours;

recording a second recording mark having the same bit length as the first recording mark on the recording layer after the high-temperature storage;

measuring an area of the second recording mark; and determining whether or not the area of the second recording mark is 0.85 times or more the area of the first recording mark.

* * * * *